3,252,240
3-SUBSTITUTED PIPERAZINEDIONES AND METHOD OF PREPARING SAME

Edward Rudolph Ruso, Nanuet, and Duff Shederic Allen, Jr., Dobbs Ferry, N.Y., and Sidney A. Frankel, Edison, N.J., assignors to American Cyanamid Company, Stamford, Conn., a corporation of Maine
No Drawing. Filed Aug. 20, 1963, Ser. No. 303,411
14 Claims. (Cl. 260—268)

This invention relates to an improved process of preparing piperazinediones. More particularly, it relates to the preparation of 3-disubstituted 2,6-piperazinediones.

In the past it is known that alpha-(carbomethoxymethylamino)-alpha-(phenylbutyramide)hydrochloride can be cyclized in the presence of sodium methoxide to produce 3-ethyl-3-phenyl-2,6-piperazinedione (United States Patent 2,762,805). While 3-disubstituted 2,6-piperazinediones may be prepared by this method, the intermediates are somewhat expensive to prepare and the yields overall leave something to be desired.

We have now found that piperazinediones of the formula:

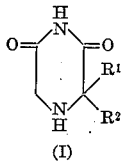

(I)

wherein $R^1$ is lower alkyl and $R^2$ is a mononuclear aryl or substituted mononuclear aryl radical can be prepared in good yields from relatively simple intermediates by heating in the presence of sulfuric acid.

A preferred method of preparing the 2,6-piperazinediones of the present invention is to heat the intermediates hereinafter described with substantially 100% sulfuric acid. The yields obtained under these conditions are 80% or greater whereas the yields obtained using approximately 96% sulfuric acid are generally less than 60%.

In carrying out the process of this invention intermediates having the following formula:

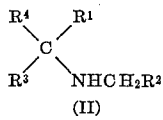

(II)

wherein $R^1$ is cyano or carboxamido; $R^2$ is cyano, carboxamido or carboalkoxy; $R^3$ is lower alkyl; and $R^4$ is a mononuclear aryl or substituted mononuclear aryl radical and acid addition salts thereof are reacted with sulfuric caid. As pointed out hereinbefore, the highest yields are obtained with substantially 100% sulfuric acid although reasonable yields can be obtained with 90% or higher sulfuric acid.

In describing the intermediates above, the term "carboalkoxy" is intended to embrace radicals having 2 to 8 carbon atoms which may be, for example, carbomethoxy, carboethoxy, carbopropoxy, carboisopropoxy and the like. The term "lower alkyl" is intended to include hydrocarbon radicals having 1 to 6 carbon atoms, for example, methyl, ethyl, n-propyl, isopropyl, n-butyl, isobutyl and the like. The term "mononuclear aryl" or "substituted mononuclear aryl" is intended to encompass aryl radicals having a single 6-membered aromatic ring which may be, for example, phenyl, halogenated phenyl, dihalogenated phenyl, alkylated phenyl, dialkylated phenyl, alkoxylated phenyl, trifluoromethylated phenyl and the like. The term substantially 100% sulfuric acid is intended to include those having a percentage of sulfuric acid greater than 99%.

In carrying out the process of this invention, the intermediates described hereinbefore are heated in sulfuric acid to a temperature ranging from about 70° C. to about 120° C. and preferably 90° C. to 110° C. The elevated temperature is maintained for a period of time sufficient for the reaction to proceed to substantial completion. This period of time may range from about 1 to about 24 hours depending somewhat upon the starting compound and the temperature used. After completion of the reaction, the product is recovered and purified by conventional methods described hereinafter in the examples.

Some of the intermediates described above and found useful in the process of this invention are described and claimed in our copending application Serial No. 303,410 filed August 20, 1963.

The 3-lower alkyl-3-mononuclear aryl 2,6-piperazinediones of the present invention have valuable central nervous depressant activity. For example, when the compound 3-ethyl-3-phenyl-2,6-piperazinedione is tested in mice, the reduction of spontaneous motor activity is more effective than that produced by meprobamate (a recognized tranquilizer). In a similar test when the above compound is compared with phenobarbital (a recognized hypnotic), the latter does not show tranquilizing action in the test. The compounds produced by the process of this invention when tested in mice are indicative of activity such as hypnotics, tranquilizers and muscle relaxants in warm blooded animals.

The following examples illustrate in greater detail the preparation of representative 3-lower alkyl-3-mononuclear aryl 2,6-piperazinediones by cyclization with sulfuric acid.

EXAMPLE I

*Preparation of 3-ethyl-3-phenyl-2,6-piperazinedione*

To 4.0 ml. of 99.9% sulfuric acid is added, in portions, 2.01 g. of 2-[(α-cyano-α-ethylbenzyl)amino]-acetamide, the temperature being maintained at less than 50° C. by external cooling. The solution is heated at 90°–92° C. for 5 hours, then cooled to 50° C. and poured slowly into a stirred mixture of 8 ml. chloroform and 10 g. ice, the temperature being maintained at 0°–6° C. The mixture is neutralized (pH 7) by the addition of concentrated ammonium hydroxide and the aqueous layer extracted with chloroform. The chloroform extracts are dried over anhydrous sodium sulfate and concentrated under reduced pressure. The slightly oily crystalline residue is triturated with a mixture of 1.0 ml. isopropyl alcohol and 3.0 ml. n-heptane, and dried to give 1.77 g. (80% of theory) of off-white crystals, melting point 116°–118.5° C.

EXAMPLE II

*Preparation of 3-ethyl-3-phenyl-2,6-piperazinedione*

To 20.0 ml. of reagent grade sulfuric acid (96–97%) is added, in portions, 10.0 g. (0.046 mole) of 2-[(α-cyano-α-ethylbenzyl)amino]-acetamide. The solution is heated at 90° C. for 16 hours, then cooled to 30° C. and poured slowly into a stirred mixture of 40 ml. of chloroform and 40 g. ice, the temperature being maintained at −2° to 6° C. The mixture is neutralized by the addition of concentrated ammonium hydroxide and the aqueous layer is thoroughly extracted with chloroform. The chloroform extracts are dried over anhydrous sodium sulfate and concentrated under reduced pressure. A solution of 6 ml. of isopropyl alcohol and 12 ml. of n-heptane is added to the residue. The product is isolated by filtration and amounts to 6.2 g. (62% of theory) of colorless crystalline solids, melting point 118°–121° C.

EXAMPLE III

*Preparation of 3-methyl-3-phenyl-2,6-piperazinedione*

To 4.0 ml. of 99.7% sulfuric acid is added in portions 2.0 g. of 2-[(α-cyano-α-methylbenzyl)amino]-acetamide, the temperature being maintained at less than 50° C. by external cooling. The solution is heated at 88°–90° C. for 5 hours, then cooled to 60° C. and poured slowly into a mixture of 8 ml. chloroform and 10 g. ice, the temperature being maintained at 0–7° C. The mixture is neutralized by the addition of concentrated ammonium hydroxide and the aqueous layer extracted with chloroform. The chloroform extracts are dried over anhydrous sodium sulfate and concentrated under reduced pressure. The slightly oily crystalline residue is triturated with a mixture of isopropyl alcohol and n-heptane and dried to give colorless crystals, melting point 131°–133° C.

EXAMPLE IV

*Preparation of 3-ethyl-3-phenyl-2,6-piperazinedione*

To 226 ml. of concentrated sulfuric acid in a 1-liter beaker fitted with a mechanical stirrer and thermometer is added 113 g. (0.4 mole) α-(carbethoxymethylamino)-α-phenylbutyronitrile HCl and a complete solution is obtained within five minutes. The solution is stirred at 90° C. (±5° C.) for five hours and cooled to about 50° C. The reaction mixture is poured slowly into 500 g. of ice with mechanical stirring while maintaining the temperature below 25° C. (ice-acetone bath). The pH of the solution is adjusted to 7.2–7.4 by the slow addition of 28% aqueous ammonia. The temperature is kept below 30° C. during the neutralization. An oily solid precipitates out. The alkaline mixture is extracted with three 500 ml. portions of chloroform. The chloroform extracts are combined, decolorized with 8–9 g. of activated charcoal and dried over anhydrous magnesium sulfate. The chloroform solution is concentrated to a tan solid residue on the steam bath at atmospheric pressure. The solid is dissolved in 150 ml. of isopropanol, treated with 5 g. of activated charcoal, filtered and concentrated at atmospheric pressure until about 125 ml. of distillate is collected. The residue is chilled and a slightly off-white solid crystallizes out. The solid is collected by filtration and washed with three 10 ml. portions of cold isopropanol. The material weighs 52.62 g. and melts one-half degree below the standard sample. The product is slurried in 55 ml. of cold (0–5° C.) isopropanol for about one hour and collected by filtration. The purified material weighs 50.1 g. (57.5%) and melts with the standard sample at 120.5°–121.5° C.

A 2349 g. sample of 3-ethyl-3-phenyl-2,6-piperazinedione is dissolved in 10 liters of chloroform (insolubles present), stirred with 50 g. of activated charcoal and is clarified. The activated charcoal treatment is repeated two more times. The chloroform solution is concentrated to a solid residue and 3 liters of isopropyl alcohol is added. The slurry is cooled to −5° C. and the solid collected by filtration. The cake is washed with two 300 ml. portions of isopropyl alcohol at 0° C. and dried to yield 1891 g. of analytically pure material. The alcohol washes and filtrate are combined, treated with activated charcoal and concentrated to a solid residue. Petroleum ether, 90°–100° C. cut, is added and the bright yellow solid is collected by filtration. After slurrying in isopropanol (20° C.), the off-white cake is then slurried in diethyl ether and collected by filtration to yield 70 g., melting point 122°–123° C. of analytically pure, slightly off-white material. This represents a recovery of 1961 g. (83.5%).

EXAMPLE V

*Preparation of 3-phenyl-3-n-propyl-2,6-piperazinedione*

A sample of 150 ml. of 96% sulfuric acid is placed in a 500 ml. three-necked, round-bottomed flask fitted with a mechanical stirrer, thermometer and air condenser protected with a drying tube. To this is added in portions 36.0 g. (0.125 mole) 2-carboxymethylamino-2-phenylvaleramide hydrochloride, the addition of each portion causing heavy evolution of hydrogen chloride, with foaming and a slight rise in temperature. This dark solution is heated on a steam bath (95° C.±3° C.) for 4¼ hours. The solution is cooled and added slowly to 300 g. of crushed ice in a 1-liter three-necked, round-bottomed flask fitted with a mechanical stirrer and thermometer; this flask is cooled in an ice-alcohol bath. The resulting dark aqueous solution is decolorized with activated charcoal and filtered through diatomaceous earth, then the cake is washed with three 50 ml. portions of water. The combined filtrate and washes are chilled in an ice-acetone bath and treated with solid potassium carbonate to pH 7.1–7.2. A heavy white solid precipitate is collected and washed with six 50 ml. portions of chloroform. The aqueous filtrate and chloroform washes are placed in a separatory funnel, the layers separated, and the aqueous phase is extracted with three 100 ml. portions of chloroform. All chloroform extracts are combined and air dried over magnesium sulfate and activated charcoal. Concentration of the chloroform layer at reduced pressure yields 19.0 g. of a light yellow colored oil. This oil is taken up in 200 ml. of anhydrous diethyl ether, the solution is saturated with anhydrous hydrogen chloride and a white solid is isolated. This solid is washed well with anhydrous diethyl ether and air dried; yield 11.6 g.

Five grams of the above hydrochloride is slurried in 25 ml. of water and 25 ml. of chloroform, and 28% aqueous ammonia is added to pH 8. The layers are separated and the aqueous phase is extracted with two 25 ml. portions of chloroform. The combined chloroform extracts are extracted with a 25 ml. portion of 5% aqueous sodium bicarbonate, dried over magnesium sulfate and activated charcoal, filtered through diatomaceous earth and concentrated at reduced pressure to a very viscous oil. This oil is dissolved in i-propanol, the solution decolorized with activated charcoal and concentrated to a colorless oil under reduced pressure. This oil is treated with about 125 ml. of n-hexane; on standing, the oil solidified to a white solid, which is collected, washed well with n-hexane and air dried to yield 3.1 g. (melting point 75°–77° C.).

Another 6.3 g. of the hydrochloride is treated as above and 4.5 g. of base is obtained (melting point 74°–77° C.).

The 3.1 g. and 4.5 g. fractions of the base are combined, dissolved in 150 ml. of anhydrous ether, decolorized with activated charcoal and the solution concentrated at reduced pressure to a colorless oil. On treatment with 200 ml. of n-hexane the oil crystallizes. The solid is collected, washed well with n-hexane and air dried to a constant weight of 7.0 g. (melting point softened at 65°–66° C., melts at 74°–75.5° C.). The 7.0 g. of product is added to 300–350 ml. of petroleum ether (30°–60°) and the mixture heated under reflux for six hours. The solid is collected by filtration, washed well with petroleum ether and air dried. Weight of product, 6.0 g. melting point 75.5°–77° C.

EXAMPLE VI

*Preparation of 3-ethyl-3-phenyl-2,6-piperazinedione*

Forty ml. of 96% sulfuric acid is charged to a 250 ml. round-bottomed, three-necked flask fitted with a mechanical stirrer, thermometer and dropping funnel. 19.4 g. (0.0974 mole) 2-cyanomethylamino-2-phenylbutyronitrile is added slowly (dropwise) to the acid. The addition is very exothermic and 62° C. rise in temperature is observed after about half of the dinitrile has been added. The addition is interrupted, the mixture allowed to cool to about 70° C. and the addition then resumed. After the addition is complete, the very dark solution is heated at 95°–97° C. for about five hours. The solution is cooled to about 75° C. and poured slowly over 100 g. of crushed ice. A small amount of gummy material separates and is removed by filtration after the addition of 3 g. of activated charcoal. The cake is washed with three 25 ml. portions of water. The filtrate and washes are combined and 200 ml. of chloroform added and cooled in a Dry Ice/acetone bath while 92 ml. of 28% aqueous ammonia is slowly added. The pH at the end of the ammonia addition is 6.8–7.0. The resulting mixture is transfered to a separatory funnel and the layers separated. The aqueous phase is extracted with two 100 ml. portions of chloroform. The chloroform extracts are combined, dried over magnesium sulfate and concentrated on a rotary evaporator to a tan oil. The oil is dissolved in about 200 ml. of isopropanol, decolorized with activated charcoal and filtered through diatomaceous earth. The filter cake is washed with three 20 ml. portions of isopropanol. The filtrate and washes are combined and concentrated to a tan solid on a rotary evaporator. The solid residue is dissolved in 100 ml. of dilute aqueous hydrochloric acid. The acid solution is decolorized with activated charcoal and filtered. The filtrate is adjusted to pH 6.8–7.0 with 28% aqueous ammonia. A thick precipitate of white solid formed, which is collected by filtration, washed well with water and air dried overnight. The slightly damp product is slurried in 150 ml. of petroleum ether (30–60° C.) and the slurry filtered. The material is air dried to a constant weight of 7.5 g. (35%). The material melts the same as an analytically pure sample at 120°–121.5° C.

EXAMPLE VII

*Preparation of 3-methyl-3-phenyl-2,6-piperazinedione*

Forty ml. concentrated sulfuric acid (97%) is charged to a 250 ml. three-necked, round-bottomed flask fitted with a mechanical stirrer and thermometer. 17.0 g. (0.0920 mole) 2-cyanomethylamino-2-phenylpropionitrile is added slowly. The reaction is quite exothermic and the temperature rises from 24° to 100° C. (no cooling bath used). The dark mixture is heated on a steam bath at 95°–98° C. for five hours. The reaction mixture is cooled to 80°–85° C. and poured into a mixture of 100 g. of crushed ice and 80 ml. of chloroform. This mixture is chilled in an ice-acetone bath and the pH adjusted to 6.6–7.0 with 28% aqueous ammonia. The layers are separated and the aqueous phase extracted with three 100 ml. portions of chloroform. The chloroform extracts are combined, decolorized with activated charcoal, dried over anhydrous magnesium sulfate, filtered and the filtrate concentrated on a rotary evaporator to an amber oil. The above oil is dissolved in about 100 ml. isopropanol, decolorized with activated charcoal and filtered. The filtrate is diluted with three volumes of n-heptane, which causes an amber oil to separate. Enough isopropanol is added to redissolve the oil and the solution concentrated on a rotary evapoartor to a gummy solid. The solid is recrystallized from 60–70 ml. of isopropanol. The material obtained, weighed 7.1 g. (38%) and melts at 130°–132° C. (analytically pure material is reported to melt at 133.5°–134.5° C.).

EXAMPLE VIII

*Preparation of 3-ethyl-3-p-chlorophenyl-2,6-piperazinedione*

To 45 ml. of 99.6% sulfuric acid is added, in portions, 22.0 g. of 2-([α-cyano-α-ethyl-(p-chlorobenzyl)]amino)-acetamide. The solution is heated at 90° C. for 5 hours, then cooled to 60° C. and poured slowly into a stirred mixture of 80 ml. of chloroform and 80 g. of ice, the temperature being maintained at 0°–5° C. The mixture is neutralized (pH 7) by the addition of 125 ml. concentrated ammonium hydroxide and the aqueous layer is extracted with chloroform. The chloroform extracts are dried over anhydrous sodium sulfate and concentrated under reduced pressure. The slightly oily crystalline residue is triturated with a mixture of isopropyl alcohol and n-heptane and dried to give a pale tan solid, melting point 132°–136° C.

EXAMPLE IX

*Preparation of 3-methyl-3-p-chlorophenyl-2,6-piperazinedione*

To 19.6 ml. of 99.9% sulfuric acid is added, in portions, 9.8 g. of 2-([α-cyano-α-methyl-(p-chlorobenzyl)] amino)-acetamide. The solution is heated at 90° C. for 5 hours, then cooled to 50° C. and poured slowly into a stirred mixture of 100 ml. of chlorofrm and 100 g. of ice, the temperature being maintained at 0.7° C. The mixture is neutralized (pH 7) by the addition of 60 ml. concentrated ammonium hydroxide and the aqueous layer extracted with chloroform. The chloroform extracts are dried over anhydrous sodium sulfate and concentrated under reduced pressure. The oily residue is treated with a mixture of 10 ml. of isopropanol and 10 ml. of n-heptane. The off-white product, isolated by filtration, melts at 145°–148° C.

EXAMPLE X

*Preparation of 3-methyl-3-m-chlorophenyl-2,6-piperazinedione*

To 50.0 ml. of 99.6% sulfuric acid is added, in portions, 25.0 g. of 2-([α-cyano-α-methyl-(m-chlorobenzyl)] amino)-acetamide. The solution is heated at 90° C. for 5 hours, then cooled to 60° C. and poured slowly into a stirred mixture of 150 ml. of chloroform and 150 ml. of ice, the temperature being maintained at 0°–10° C. The mixture is neutralized (pH 7) by the addition of concentrated ammonium hydroxide and the aqueous layer is extracted with chloroform. The chloroform extracts are dried over anhydrous sodium sulfate and concentrated under reduced pressure. The oily residue is treated with a mixture of isopropanol and n-heptane. The tan-colored product is isolated by filtration and melts at 114°–117° C. Repeated recrystallization from chloroform-isopropanol gives a colorless solid, melting point 119°–122° C.

EXAMPLE XI

*Preparation of 3-methyl-3-(3,4-dichlorophenyl)-2,6-piperazinedione*

To 20 ml. of 99.9% sulfuric acid is added 10 g. of 2 - ([α - cyano - α-methyl-(3,4-dichlorobenzyl)]amino) acetamide. The mixture is heated at 90° C. for 5 hours, then cooled to 50° C. and poured slowly into a stirred mixture of 100 ml. of chloroform and 100 g. of ice, the temperature being maintained at 0°–5° C. The mixture is neutralized by the addition of 65 ml. concentrated ammonium hydroxide and the aqueous layer is extracted with chloroform. The chloroform extracts are dried over anhydrous sodium sulfate and concentrated under reduced pressure. The oily residue is treated with a mixture of isopropanol and n-heptane. The white crystalline product is isolated by filtration.

EXAMPLE XII

*Preparation of 3-methyl-3-(3,4-dimethylphenyl)2,6-piperazinedione*

To 17 ml. of 99.9% sulfuric acid is added, in portions, 8.5 g. of 2-([α-cyano-α-methyl-(3,4-dimethylbenzyl)]amino)acetamide. The solution is heated at 90° C. for 5 hours, then cooled to 50° C. and poured slowly into a stirred mixture of 100 ml. of chloroform and 40 g. of ice, the temperature being maintained at 0°–5° C. The mixture is neutralized (pH 7) with concentrated ammonium hydroxide and the aqueous layer is extracted with chloroform. The chloroform extracts are dried over anhydrous sodium sulfate and concentrated under reduced pressure. The residue is treated with a mixture of isopropanol and petroleum ether. The off-white crystalline product, melting point 150°–151° C., is isolated by filtration.

EXAMPLE XIII

*Preparation of 3-methyl-3-(m-α,α,α-trifluoromethyl phenyl-)2,6-piperazinedione*

To 22 ml. of 99.6% sulfuric acid is added, in portions, 9.2 g. of 2-([α-cyano-α-methyl-(m-α,α,α-trifluoromethylbenzyl)]amino)acetamide. The solution is heated at 90° C. for 5 hours, then cooled to 50° C. and poured slowly into a stirred mixture of 100 ml. of chloroform and 100 g. of ice, the temperature being maintained at 0°–5° C. The mixture is neutralized (pH 7) by the addition of concentrated ammonium hydroxide and the aqueous layer is extracted with chloroform. The chloroform extracts are dried over anhydrous sodium sulfate and concentrated under reduced pressure. The oily residue is treated with a mixture of isopropanol and heptane. The colorless crystalline product is isolated by filtration, melting point 115°–116° C.

We claim:

1. A method of preparing piperazinediones of the formula:

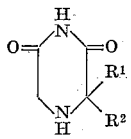

wherein $R^1$ is lower alkyl and $R^2$ is selected from the group consisting of phenyl, halophenyl, dihalophenyl, lower alkylphenyl, di(lower)alkylphenyl, lower alkoxyphenyl and trifluoromethylphenyl which comprises heating to a temperature within the range of from about 70° C. to about 120° C. for a period of from about 1 to about 24 hours concentrated sulfuric acid and a compound of the formula:

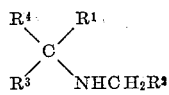

wherein $R^1$ is cyano, $R^2$ is selected from the group consisting of, carboxamido and carboloweralkoxy, $R^3$ is lower alkyl, $R^4$ is selected from the group consisting of phenyl, halophenyl, dihalophenyl, lower alkylphenyl, di(lower)alkylphenyl, lower alkoxyphenyl and trifluoromethylphenyl and acid addition salts thereof.

2. A method in accordance with claim 1 in which the concentrated sulfuric acid is substantially 100% sulfuric acid.

3. A method of preparing a 3-lower alkyl-3-phenyl-2,6-piperazinedione which comprises heating a 2[(α-cyano-α-lower alkyl benzyl)amino]-acetamide with substantially 100% sulfuric acid at a temperature within the range of from about 70° C. to about 120° C. for a period of from about 1 to about 24 hours.

4. A method of preparing 3-ethyl-3-phenyl-2,6-piperazinedione which comprises heating 2[(α-cyano-α-ethyl benzyl)amino]-acetamide with substantially 100% sulfuric acid at a temperature within the range of from about 70° C. to 120° C. for a period of from about 1 to about 24 hours.

5. A method of preparing 3-methyl-3-phenyl-2,6-piperazinedione which comprises heating 2[(α-cyano-α-methyl benzyl)amino]-acetamide with substantially 100% sulfuric acid at a temperature within the range of from about 70° C. to about 120° C. for a period of from about 1 to about 24 hours.

6. A method of preparing 3 - phenyl - 3-n-propyl-2,6-piperazinedione which comprises heating 2-carboxymethylamino-2-phenylvaleramide with substantially 100% sulfuric acid at a temperature within the range of about 70° C. to about 120° C. for a period of from about 1 to about 24 hours.

7. A method of preparing 3-ethyl-3-p-chlorophenyl-2,6-piperazinedione which comprises heating 2[(α-cyano-α-ethyl-(p-chlorobenzyl)]amino)acetamide with substantially 100% sulfuric acid at a temperature within the range of about 70° C. to about 120° C. for a period of from about 1 to about 24 hours.

8. A method of preparing 3-methyl-3-p-chlorophenyl-2,6-piperazinedione which comprises heating 2([α-cyano-α-methyl-(p-chlorobenzyl)]amino)acetamide with substantially 100% sulfuric acid at a temperature within the range of from about 70° C. to about 120° C. for a period of from about 1 to about 24 hours.

9. A method of preparing 3-methyl-3-m-chlorophenyl-2,6-piperazinedione which comprises heating 2([α-cyano-α-methyl-(m-chlorobenzyl)]amino)-acetamide with substantially 100% sulfuric acid at a temperature within the range of from about 70° C. to about 120° C. for a period of from about 1 to about 24 hours.

10. The compound 3-ethyl-3-p-chlorophenyl-2,6-piperazinedione.

11. The compound 3-methyl-3-p-chlorophenyl-2,6-piperazinedione.

12. The compound 3-methyl-3-m-chlorophenyl-2,6-piperazinedione.

13. The compound 3-methyl-3-(3,4-dichlorophenyl)2,6-piperazinedione.

14. The compound 3-methyl-3-(m-α,α,α-trifluoromethylphenyl)-2,6-piperazinedione.

References Cited by the Examiner

UNITED STATES PATENTS

| | | | |
|---|---|---|---|
| 2,750,383 | 6/1956 | Safir et al. | 260—268 |
| 2,762,804 | 9/1956 | Safir et al. | 260—268 |
| 2,762,805 | 9/1956 | Safir et al. | 260—268 |
| 2,763,652 | 9/1956 | Safir et al. | 260—268 |
| 2,927,114 | 3/1960 | Izzo et al. | 260—268 |

OTHER REFERENCES

Degering: An Outline of Organic Nitrogen Compounds, by University Litho Printers, Ypsilanti, Mich., pages 401–402, (1950).

Izzo et al.: Journal American Chemical Society, vol. 81, pages 4668–70 (1959).

Uhlig: Angewandte Chemie, vol. 66, pages 435–436, (1954).

NICHOLAS S. RIZZO, *Primary Examiner.*

JAMES W. ADAMS, *Assistant Examiner.*